(12) United States Patent
Lin et al.

(10) Patent No.: US 6,774,894 B1
(45) Date of Patent: Aug. 10, 2004

(54) PROCESSING METHOD FOR RENDERING A 3-DIMENSIONAL ARROW OBJECT

(75) Inventors: Tsung-Wei Lin, Taipei (TW); Chih-Hsuan Liu, Taipei (TW); Shih-Yang Wang, Taipei Hsien (TW)

(73) Assignee: Ulead Systems, Inc., Taipei (TW)

( * ) Notice: Subject to any disclaimer, the term of this patent is extended or adjusted under 35 U.S.C. 154(b) by 146 days.

(21) Appl. No.: 09/665,737

(22) Filed: Sep. 20, 2000

(30) Foreign Application Priority Data

Oct. 2, 1999 (TW) .................................. 88116989 A (51) Int. Cl.$^7$ .............................................. G06T 15/00
(52) U.S. Cl. ...................................................... 345/419
(58) Field of Search .................................... 345/441, 419

(56) References Cited

U.S. PATENT DOCUMENTS

| | | | |
|---|---|---|---|
| 5,812,113 A | * 9/1998 | Ikeda et al. | .................. 345/856 |
| 5,828,380 A | 10/1998 | Lin | |
| 6,144,382 A | * 11/2000 | Hill | ............................. 345/619 |
| 6,392,674 B1 | * 5/2002 | Hiraki et al. | ............... 345/857 |
| 6,545,674 B1 | * 4/2003 | Lin | ............................. 345/419 |

FOREIGN PATENT DOCUMENTS

TW        299413        7/1996

OTHER PUBLICATIONS

Foley et al., Computer Graphics: Principles and Practice, 1997, Addison–Wesley, Second Edition, pp. 201,745–746, 835.*

Russ, The Image Processing Handbook, 1995 CRC Press Inc., Second Edition, p. 414.*

Foley et al, Computer Graphics: Principles and Practice, 1997, pp. 201, 745, 747, 835.*

Russ, The Image Processing Handbook, 1995, pp. 414.*

* cited by examiner

*Primary Examiner*—Mark Zimmerman
*Assistant Examiner*—Linzy McCartney
(74) *Attorney, Agent, or Firm*—Birch, Stewart, Kolasch & Birch, LLP (57) ABSTRACT

A processing method for rendering a planar arrow object into a 3-dimensional arrow object. The processing method of this invention comprises the steps as follows: setting a total length of an arrow object, wherein the arrow object includes at least one end having the arrowhead portion; determining the arrowhead portion and the line portion of the arrow object; creating a corresponding first mapping data of the line portion, wherein the first mapping data represents the third axis data associated with the pixels of the line portion; extracting a corresponding arrowhead graphical data of the arrowhead portion; creating a corresponding second mapping data of the graphical data of the arrowhead portion, wherein the second mapping data represents the third axis data corresponding to the pixels of the graphical data of the arrowhead portion; creating the respectively corresponding masks of the line portion and the arrowhead portion; superimposing the arrowhead mask and the line mask so as to create an arrow object mask; and creating a 3-dimensional image of the arrow object according to the first mapping data and the second mapping data and utilizing the arrow object mask.

14 Claims, 6 Drawing Sheets

PROCESSING METHOD FOR RENDERING A 3-DIMENSIONAL ARROW OBJECT

BACKGROUND OF THE INVENTION

1. Field of the Invention

This invention relates to a computer graphics method, and particularly to a rendering method for rendering an arrow object to a 3-dimensional visual effect.

2. Description of the Related Art

In the prior art, a 3-dimensional image processing effect on an object, i.e. a solid effect, is typically achieved by a polygonal approach. The polygonal approach can be summarized by the following steps: determine a certain shape 2-dimensional picture, cut the picture into a plurality of polygons using a computer, then change pixel color values in each polygon by interpolation, thereby achieving a solid effect. However, because the shape of a 2-dimensional picture is formed with continuous curve, the operation of display a 2-D graph as a 3-D graph is performed by a high-order polynomial equations and an approach method. This requires the use of complicated computation and results in a rough visual effect. Alternatively, if a 3-dimensional object is directly processed for a 3-dimensional image display, a great amount of computation is required and the resulting display can be rough in quality.

Further, the conventional 3-dimensional process has difficulty dealing with specifically 3-dimensional visual effect, for example, rendering a 2D arrow object graphical display from 3-dimensional arrow object image data stored in memory. An arrow object has an arrowhead and a line. Typically, the line portion of an arrow object is rendered using a real 3D pipe object. Because the image data converted from the 3D pipe object is stored in the 3D form but the image data on display is need in the 2D form, further processes using the stored 3D image data are complicated. For example, it is difficult to combine a 3D pipe object with a 3D arrowhead object to form a 3D arrow object graph due to the connection of anti-aliasing boundaries from the 3D-to-2D conversion data.

A processing method for rendering a 3-dimensional image effect based on a 2-dimensional image object has been disclosed in U.S. Pat. No. 5,828,380. This processing method finds the corresponding relation mapping function of each pixel of a picture to obtain a pixel vector mapping relation corresponding to a 2-dimensional image object. The pixel vector mapping relation is further used to create an image effect on relation map, thereby creating the 3-dimensional effect. For example, by creating the corresponding length of the third axis (i.e. z-axis), a substantially solid effect is achieved.

Figure 1:
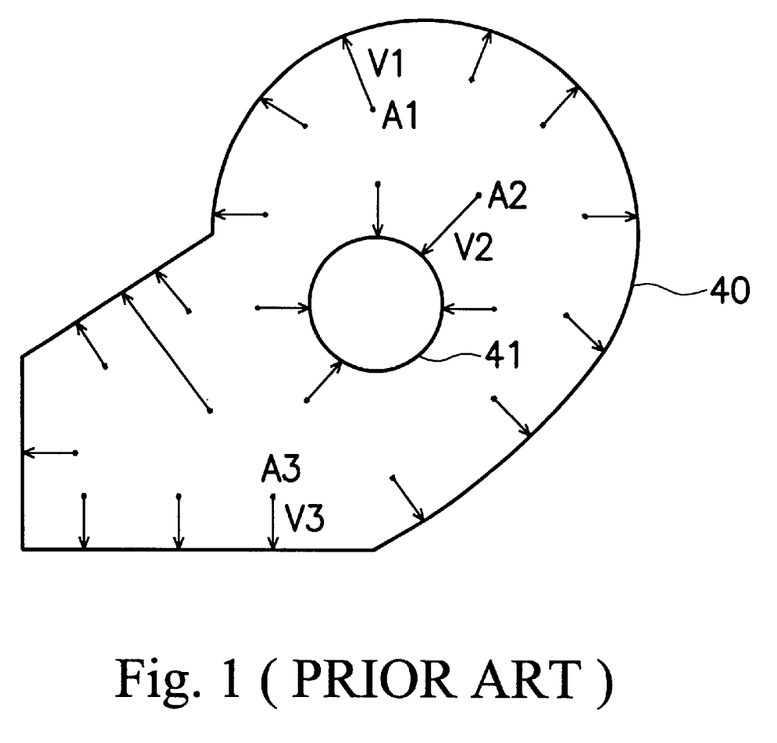
FIG. 1 is a schematic diagram illustrating the relation mapping function of a graph in the prior art.

FIG. 1 is a schematic diagram illustrating a mapping function relative to a certain picture in the prior art. As shown in FIG. 1, a 2-dimensional picture object is a circular area between an outer ring 40 and an internal ring 41. The 2-dimensional picture object, i.e., the circular area, comprises multiple pixels (in a grid arrangement), for example, A1, A2, and A3 in FIG. 1. The corresponding relation mapping function defines a vector to each pixel, the vector representing the relation of the pixel and the closest vector of the picture object edge, for example, V1, V2, V3 of FIG. 1.

The image effect on relation map is the function of performing the 2D to 3-D conversion. A threshold length (hereinafter denoted by r1) is defined in the image effect on relation map to represent a pixel applied to the 2-D to 3-D transform only if the length from the pixel to the edge of the picture object is within the threshold length. Each pixel within the threshold length is determined by a predetermined contour (to describe the z-axis corresponding to each pixel) to present the substantially solid effect.

The image processing method in the U.S. Pat. No. 5,828,380 discloses a simple operation to quickly achieve the 3-D display effect. However, the U.S. Pat. No. 5,828,380 does not teach us how to join two objects for displaying on a screen. More importantly, using the vector in the 2-D picture object, the solid arrow object picture difficult to achieve in the prior art can be easily rendered.

SUMMARY OF THE INVENTION

Accordingly, the primary object of the invention is to provide a processing method for rendering a 3-dimensional display. The processing method can utilize a simple operation to quickly achieve a 3-dimensional display. Further, the processing method can add various additional graphical processes, e.g., converting a line into a dashline, into the 3D display.

To realize the above and other objects, the invention provides a processing method for rendering a planar arrow object into a 3-dimensional arrow object, the method comprising the steps as follows: setting a total length of an arrow object, wherein the arrow object includes at least one end having the arrowhead portion; determining the arrowhead portion and the line portion of the arrow object; creating a corresponding first mapping data of the line portion, wherein the first mapping data represents the third axis data associated with the pixels of the line portion; extracting a corresponding arrowhead graphical data of the arrowhead portion; creating a corresponding second mapping data of the graphical data of the arrowhead portion, wherein the second mapping data represents the third axis data corresponding to the pixels of the graphical data of the arrowhead portion; creating the respectively corresponding masks of the line portion and the arrowhead portion; superimposing the arrowhead mask and the line mask so as to create an arrow object mask; and creating a 3-dimensional image of the arrow object according to the first mapping data and the second mapping data and utilizing the arrow object mask.

In a second embodiment, other graphical processes to the arrow object can be included when rendering the solid arrow object. For example, the line portion of the arrow object can be converted into a dashline form. The method of the dashline conversion is proceeded as follows: creating a dashline mask based on the line portion, superimposing the line mask and the arrowhead mask, subtracting the dashline mask from the superimposed mask to create an arrow object, and creating a 3-dimensional image of the arrow object. After the processing, the line portion of the arrow object is present in a dashline form.

BRIEF DESCRIPTION OF THE DRAWINGS

The aforementioned objects, features and advantages of this invention will become apparent by referring to the following detailed description of a preferred embodiment with reference to the accompanying drawings, wherein.

DETAILED DESCRIPTION OF THE INVENTION

This invention provides a processing method for rendering a solid arrow object. The processing method processes a 2-dimensional graph using directional vector mapping to determine an arrowhead portion and a line portion of the arrow object. The method of this invention is quick and effective.

FIRST EMBODIMENT

Figure 2:
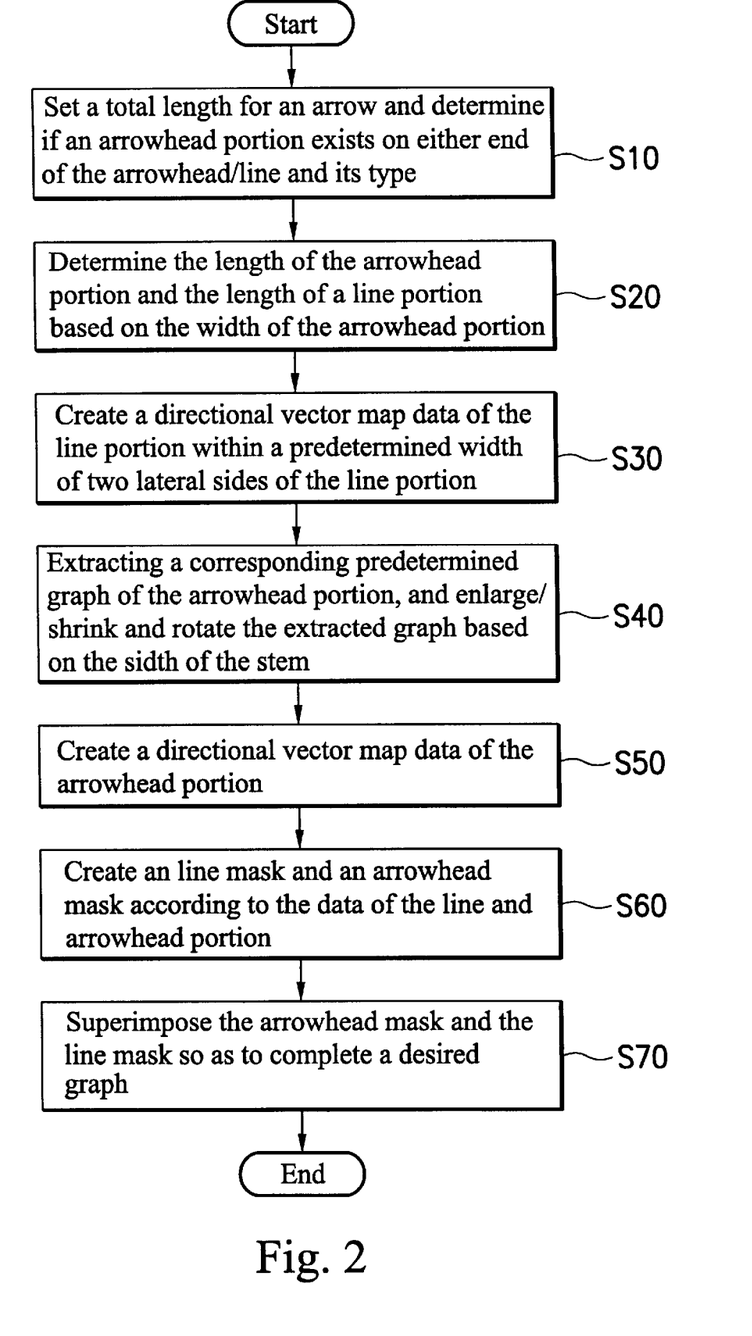
FIG. 2 is a flowchart illustrating the processing method for rendering the solid arrow object according to a first embodiment of the invention.
Figure 3:
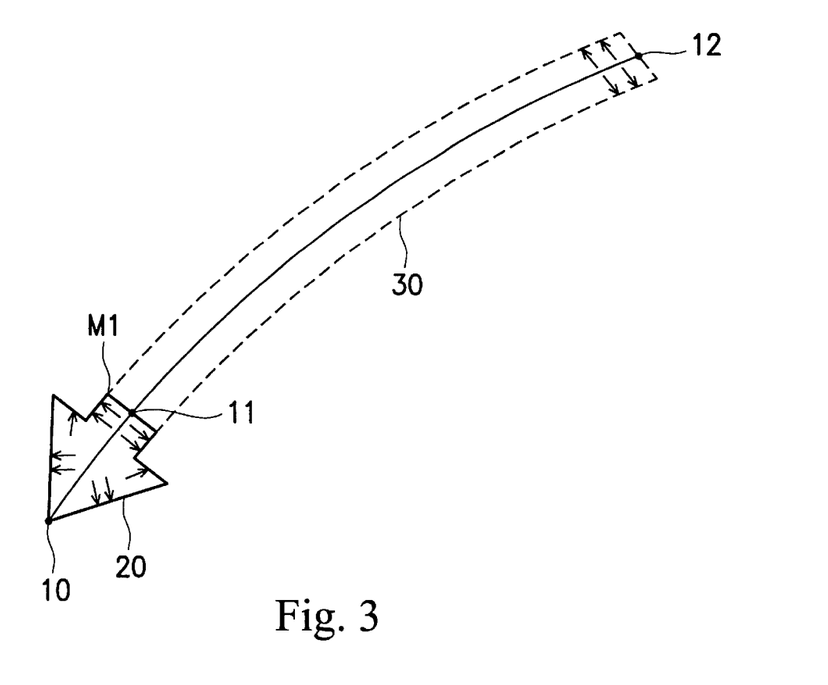
FIG. 3 is a schematic diagram illustrating an arrow object of the first embodiment of the invention.
Figure 4:
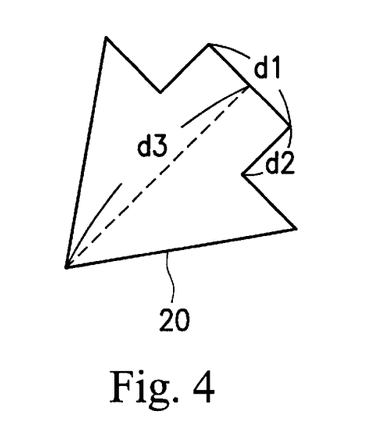
FIG. 4 is a schematic diagram illustrating an arrowhead portion of the first embodiment of the invention.

Referring to FIG. 2, a flowchart illustrates a processing method for rendering a solid arrow object according to a first embodiment of the invention. Referring FIG. 3, a schematic diagram illustrates an arrow object, the arrow object including an arrowhead portion 20 and a line portion 30, wherein the length of the arrow object is from point 10 to point 12. FIG. 4, a schematic diagram illustrates an arrowhead portion 20, wherein d1 is the width of the stem of the arrowhead, d2 is the length of the stem of the arrowhead, and d3 is a portion of length of the arrowhead.

In this embodiment, the arrowhead is created by performing processes (for example, enlarging, shrinking, rotating) for a predetermined arrowhead graph for a graphical database or for an arrowhead prototype. In the processing of the arrowhead prototype, the end of the stem (i.e., the edge d1) is determined. The arrowhead prototype stored in the graphical database is typically stored in the polygon form, i.e., the coordinate value of each terminal is stored without any rotating angle (that is, the arrowhead is directed to the x axis). The change of the x coordinate value between two adjacent terminals and the x value can determine the end of the stem. If no change happens and the x value is the maximum, the two adjacent terminals are the end of the stem. Therefore, the enlarging, shrinking, and rotating processes are performed based on the determined end of the stem. Further, the end position of the stem's width can be directly specified in the data structure of the arrowhead prototype of the graphical database so that the end of the stem is determined without an additional calculation. However, the data structure in such a process becomes more complicated.

For an arrowhead graphical prototype, the graphical parameters have a certain proportion, for example, d1:d2:d3=2:1:4. Therefore, if a user desires an arrowhead size other than that in the graphical database, the desired arrowhead is created by enlarging or shrinking the arrowhead graphical prototype based on the width d1 of the stem of the desired arrowhead. This is because the length d2 of the stem and the length d3 of the arrowhead 20 are determined in proportion to d1. Further, an actual arrowhead portion typically appears with a certain rotating angle, while the arrowhead graphical prototypes are stored without any rotating angle. Therefore, a rotating is performed on the prototype is performed to obtain the desired arrowhead. The enlarging, shrinking, and rotating processes are well known to a person skilled in the art.

Return to the flowchart for rendering the solid arrow object as shown in FIG. 2. First, set a total length l for the arrow object and determine if an arrowhead portion exists on either end of the arrow object. If yes, determine the corresponding arrowhead type (s10). In this embodiment, assume that only one arrowhead is located on the end 10 of the arrow object. The arrowhead type indicates the predetermined different arrowhead graph in the graphical database. Then, the length d3 of the arrowhead portion 20 is determined based on the width d1 of the arrowhead portion 20 and the arrowhead type (as shown in FIG. 4). Because an entire arrow object comprises an arrowhead portion 20 and a line portion 30, the line portion 30 is obtained by subtracting the length d3 of the arrowhead portion 20 from the entire length l of the arrow object, i.e., $$d4 = l - d3 \tag{1}$$

Therefore, the point 11 on the boundary between the point 10 and the point 12 is determined. The arrowhead portion 20 is between the point 10 and the point 11, and the line portion 30 is between the point 11 and the point 12 (s20). Finally, the arrowhead 20 and the line portion 30 are processed respectively and connected to be an arrow object.

Figure 5A:
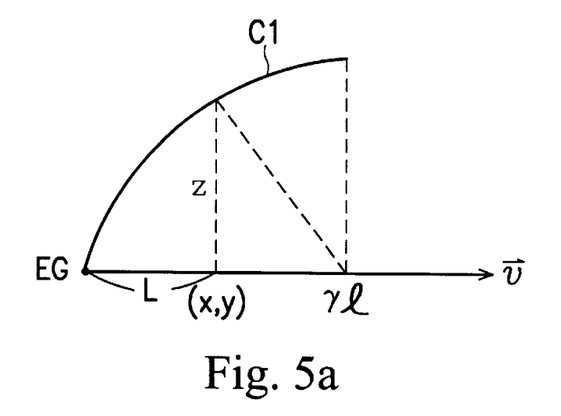
FIGS. 5a–5c are schematic diagrams illustrating the different contour curves of the bevel.
Figure 5B:
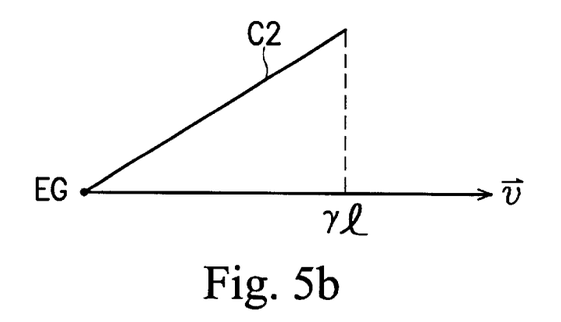
Figure 5C:
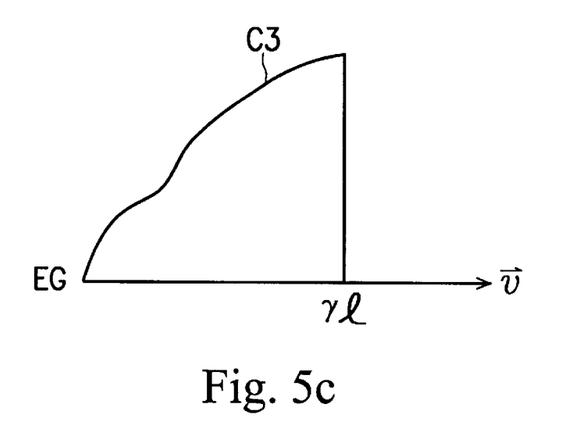

For the line portion 30, create the directional vector mapping data required by the line portion 30 within a predetermined width of the two laterals of the line portion 30 (s30). The predetermined width is assigned by the user, for example, the dashline portion as shown in FIG. 3. Assume that the 2-dimensional graphical data of the line portion is O and the directional vector mapping creation function is R(·). Thus, the directional vector mapping data of the line portion 30 is v1=R(o). The directional vector mapping data v·1 of the line portion 30 capable of representing each corresponding pixel of the third axis (i.e. z axis) is created by the image effect on relation map E(·) to obtain the parameter on the third axis corresponding to each pixel of the line portion. The image effect on relation map E(·) comprises the parameter of a threshold length(r1) and a contour curve for defining the change of each pixel on the third axis (z) within the threshold range starting from the edge. FIGS. 5a–5c respectively represent three possible contours. FIG. 5a is a rounded bevel shape and C1 represents its contour, FIG. 5b is a linear bevel shape and C2 represents its contour, and FIG. 5c is a combinational shape of two rounded bevels and C3 represents its contour.

An explanation is given of the rounded bevel shape of FIG. 5a. When the pixel vector (x, y) is within the defined threshold length r1, based on the defined contour curve C1, the parameter z on the third axis is based on the assumption that the distance from the pixel to the corresponding edge EG of the pixel is $L(=\sqrt{x^2+y^2})$. For this point, the pixel vector (x,y) has the parameter on the third axis as follows:

$$z = L \times \tan(\cos^{-1}((r1-L)/r1)) \tag{2}$$

Note that in the step of creating directional vector mapping data, in order to avoid an image defect on the boundary (for example, the point 11 on the boundary of FIG. 3) connecting the arrowhead portion to the line portion, the two ends of the line portion 30 are preferably open boundaries respectively (i.e., the point 11 and the point 12). The purpose of the open boundaries is to let the directional vector of the pixels close to the two ends of the line portion be directed to the lateral instead of the points 11 and 12 on their boundaries. This prevents the contour curve from appearing like the image effect on relation map $E(\cdot)$, so that the stem of arrowhead portion 20 and the line portion 30 are completely connected.

For the arrowhead portion 20, at first extract the predetermined arrowhead graph from the graphical database (not shown) assigned by the user, and then enlarge, shrink, and rotate the extracted arrowhead graph based on the width of the stem of the arrowhead portion set by the user. Thereby, an actually used arrowhead graph is obtained (s40). Assuming that the predetermined arrowhead graph is $\omega$, and is subjected to enlarging, shrinking, and rotating, so as to obtain a processed arrowhead graph $\omega 1$. Using the same method creates a directional vector mapping data v2(s50) of the arrowhead portion 20, i.e. $v2=R(\omega 1)$. When the directional vector mapping data v2 is created, the boundary of the stem (i.e., the line including the point 11) is set as an open boundary, in order to completely connect to the line portion 30. However, in practice, the boundaries of the line portion 30 and the arrowhead portion 20 can be partially overlapped, thereby avoiding a gap. Preferably, the overlapped width is one pixel. For the overlapped portion, the third axis data from the steps s30 and s50e is the same (the directional vector point to the lateral of the boundary).

The mask $\alpha 1$ for the line portion and the mask $\alpha 2$ for the arrowhead portion are created based on the data from the line portion 30 and the arrowhead portion 20. The masks $\alpha 1$ and $\alpha 2$ define the shapes of the line portion 30 and the arrowhead portion 20 in a 2D picture. The mask $\alpha 1$ is created by applying a 2D space carving function $\kappa(\cdot)$ to the directional vector mapping function v1 of the line portion 30. The expression is:

$$\alpha 1 = \kappa(v1) = \kappa(R(O)) \quad (3)$$

The mask 2 is created by applying a 2D rendering function $\phi(\cdot)$ to a 2D graphical data $\omega 1$ with the enlarged/shrink and rotated processing. The expression is:

$$\alpha 2 = \phi(\omega 1) \quad (4)$$

When the line mask $\alpha 1$ and the arrowhead mask $\alpha 2$ are superimposed, the mask for the arrow object is formed, i.e., $\alpha = \alpha 1 + \alpha 2$. Therefore, the 3D arrow object is created by combining the directional vector mapping data of the line portion 30 from the step s30 with the directional vector mapping data of the arrowhead portion 20 from the step s50(s70). Assume that the shadow function is $S(\cdot)$, the expression for the 3D arrow object image port of arrow object is:

$$O = S(E(v1+v2)), \alpha \quad (5)$$

where v1 is the directional vector mapping data of the line portion 30 and v2 is the directional vector mapping data of the arrowhead portion 20.

As mentioned above, this embodiment utilizes separate 2D graphical processing for the arrowhead and line portions, thereby achieving the object of rendering the 3D arrow object graph. Such a processing method does not require large calculations and can obtain a satisfactory performance.

SECOND EMBODIMENT

The invention also provides further processing to be applied to the rendered 3D arrow object, for example, to create a dashline on the line portion.

Figure 6:
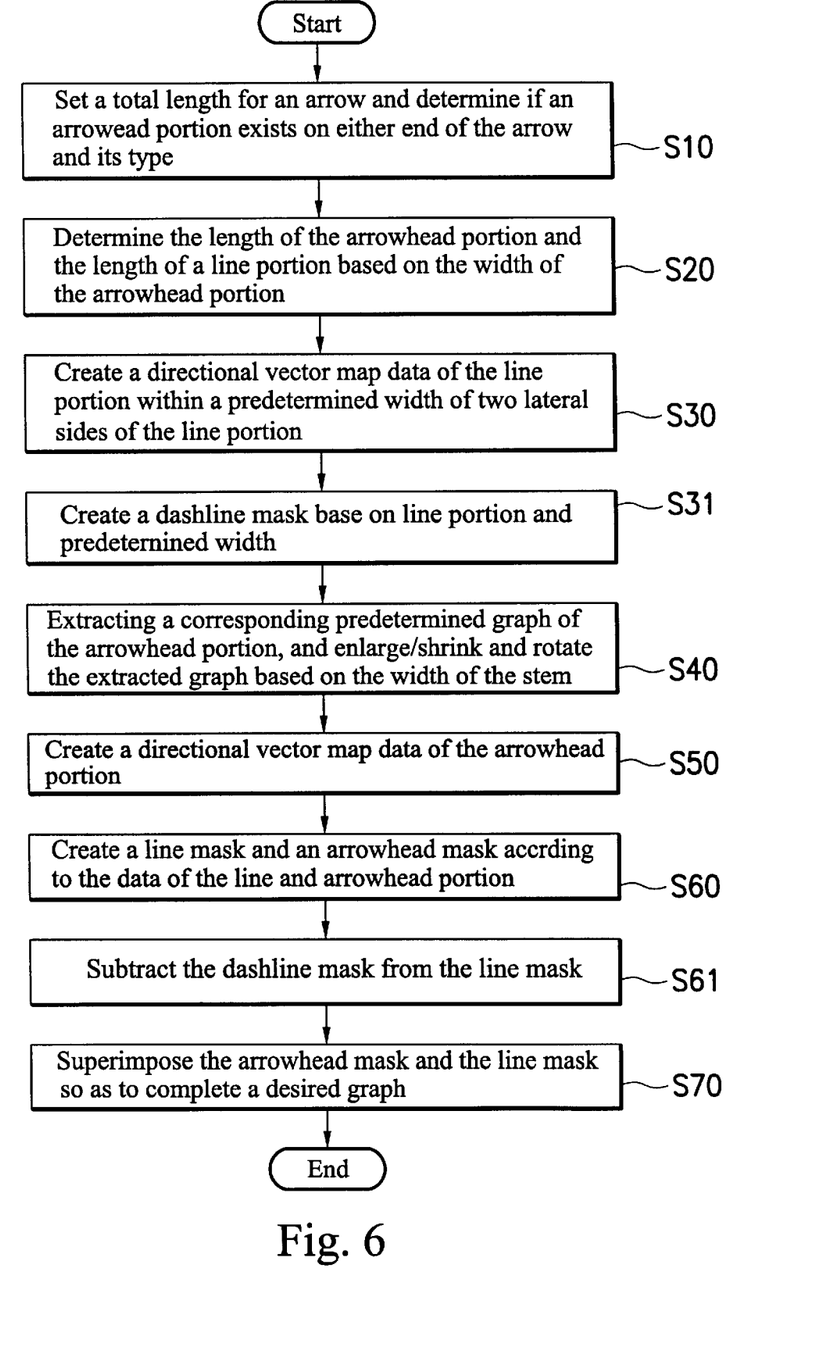
FIG. 6 is a flowchart illustrating the processing method for rendering the solid arrow object according to a second embodiment of the invention.

Referring to FIG. 6, a flowchart illustrates a processing method for rendering the solid arrow object according to a second embodiment of the invention.

In FIG. 6, the processing method for rendering the solid arrow object is the same as that of the first embodiment except for the addition of step s31 of converting the line portion 30 into a dashline form. In step s31, a dashline mask 32 is created based on the defined range of the 2D graphical data of the line portion 30. Assume that the dashline mask is $\alpha 3$ and the dash function is $D(\cdot)$, then the expression is:

$$\alpha 3 = D(0)$$

Figure 7:
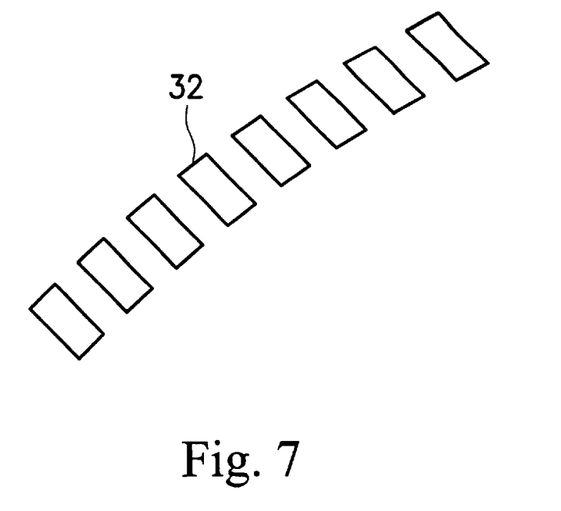
FIG. 7 is a schematic diagram illustrating a dashline mask of the second embodiment of the invention.
Figure 8:
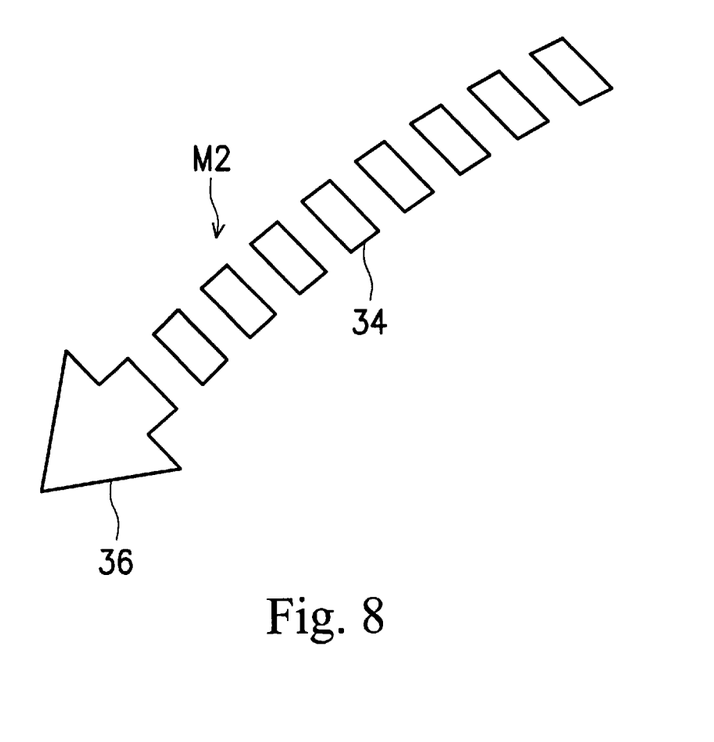
FIG. 8 is a schematic diagram illustrating an arrow object with a dotted line of the second embodiment of the invention.

The dashline mask 32 is used to filter partial areas of the line portion 30 as shown in FIG. 7. FIG. 7 is schematic diagram illustrating the dashline mask of the second embodiment of the invention. In step s61, obtain a new line mask 34 after subtracting the dashline mask 32 from the line mask. In step s70, the new line mask 34 in conjunction with the arrowhead mask 36 form an arrow object mask as required. The expression is:

$$M2 = \alpha 1 + \alpha 2 - \alpha 3 \quad (7)$$

as shown in FIG. 8. The created 3D arrow object graph 0' is expressed as follows:

$$0' = S(E(v1+v2)), M2 \quad (8)$$

where v1 is the directional vector mapping data of the line portion 30 and v2 is the directional vector mapping data of the arrowhead portion 20.

To summarize, in the invention, additional graphical processes can be added into the process of rendering the solid arrow object, so as to create a variety of graphical presentation effects.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A processing method for rendering a planar arrowhead/line into a 3-dimensional arrowhead/line, the method comprising the steps as follows:

setting a total length of an arrowhead/line, wherein the arrowhead/line includes at least one end having the arrowhead portion;

determining the arrowhead portion and the outline portion of the arrowhead/line;

creating a corresponding first mapping data of the outline portion having ends with open sides, wherein the first mapping data represents the third axis data associated with the pixels of the outline portion extracting a corresponding arrowhead graphical data of the arrowhead portion;

creating a corresponding second mapping data of the graphical data of the arrowhead portion having at least one side with an open interface, wherein the second mapping data represents the third axis data corresponding to the pixels of the graphical data of the arrowhead portion;

creating the respectively corresponding masks of the outline portion and the arrowhead portion;

superimposing the arrowhead mask and the outline mask so as to create an arrowhead/line mask; and creating a 3-dimensional image of the arrowhead/line according to the first mapping data and the second mapping data and utilizing the arrowhead/line mask.

2. The processing method of claim 1, wherein in the step of determining the arrowhead portion and outline portion of the arrowhead/line further comprises:

determining the width of the arrowhead's stem;

determining the length of the arrowhead portion based on the determined stem's width; and obtaining the length of the outline portion by subtracting the length of the arrowhead portion from the total length of the arrowhead/line.

3. The processing method of claim 1, wherein in the step of creating the first mapping data of the outline portion, the first mapping data is achieved by finding the associated data of the third axis corresponding to the outline's pixels within a predetermined width.

4. The processing method of claim 1, wherein in the step of creating the corresponding first mapping data of the outline portion, the two ends of the outline portion are regarded as the open sides; and in the step of creating the corresponding second mapping data of the arrowhead portion, the boundary of the arrowhead portion in conjunction with the outline portion is regarded as the open interface.

5. The processing method of claim 1, wherein in the step of extracting the arrowhead graphical data of the arrowhead portion, a predetermined arrowhead graph is extracted from a graphical database, and enlarging/shrinking and rotating are performed according to the stem's width of the arrowhead portion, so as to create the graphical data of the arrowhead.

6. The processing method of claim 1, wherein in the step of creating the second mapping data of the arrowhead portion, the second mapping data is achieved by finding the associated data of the third axis corresponding to the pixels of the arrowhead portion.

7. The processing method of claim 1, wherein in the step of creating a 3-dimensional image of the arrowhead/line, the 3-dimensional image is achieved by performing a shadow function upon the first mapping data and the second mapping data.

8. A processing method for rendering a planar arrowhead/line into a 3-dimensional arrowhead/line, the method comprising the steps as follows:

setting a total length of an arrowhead/line, wherein the arrowhead/line includes at least one end having an arrowhead portion;

determining the arrowhead portion and an outline portion of the arrowhead/line;

creating a corresponding first mapping data of the outline portion having ends with open sides, wherein the first mapping data represents the third axis data associated with the pixels of the outline portion;

creating a dashline mask based on the outline portion;

extracting a corresponding arrowhead graphical data of the arrowhead portion;

creating a corresponding second mapping data of the graphical data of the arrowhead portion having at least one side with an open interface, wherein the second mapping data represents the third axis data corresponding to the pixels of the graphical data of the arrowhead portion;

creating the respectively corresponding masks of the outline portion and the arrowhead portion;

superimposing the arrowhead mask and the outline mask so as to create an arrowhead/line mask; and creating a 3-dimensional image of the arrowhead/line according to the first mapping data and the second mapping data and utilizing the arrowhead/line mask.

9. The processing method of claim 8, wherein in the step of determining the arrowhead portion and outline portion of the arrowhead/line method further comprises:

determining the width of the arrowhead's steam;

determining the length of the arrowhead portion based on the determined stem's width; and obtaining the length of the outline portion by subtracting the length of the arrowhead portion from the total length of the arrowhead/line.

10. The processing method of claim 8, wherein in the step of creating the first mapping data of the outline portion, the first mapping data is achieved by finding the associated data of the third axis corresponding to the outline's pixels within a predetermined width.

11. The processing method of claim 8, wherein in the step of creating the corresponding first mapping data of the outline portion, the two ends of the outline portion are regarded as the open sides; and in the step of creating the corresponding second mapping data of the arrowhead portion, the boundary of the arrowhead portion in conjunction with the outline portion is regarded as the open interface.

12. The processing method of claim 8, wherein in the step of extracting the arrowhead graphical data of the arrowhead portion, a predetermined arrowhead graph is extracted from a graphical database, and enlarging/shrinking and rotating according to the stem's width of the arrowhead portion, so as to create the graphical data of the arrowhead.

13. The processing method of claim 8, wherein in the step of creating the second mapping data of the arrowhead portion, the second mapping data is achieved by finding the associated data of the third axis corresponding to the pixels of the arrowhead portion.

14. The processing method of claim 8, wherein in the step of creating a 3-dimensional image of the arrowhead/line, the 3-dimensional image is achieved by performing a shadow function upon the first mapping data and the second mapping data.

* * * * *